US012160161B1

(12) United States Patent
Wright et al.

(10) Patent No.: US 12,160,161 B1
(45) Date of Patent: Dec. 3, 2024

(54) IMMERSION-COOLED AXIAL FLUX ELECTRIC MOTORS AND METHODS OF OPERATING THEREOF

(71) Applicant: DIMAAG-AI, Inc., Fremont, CA (US)

(72) Inventors: Ian Wright, Woodside, CA (US); Brandon Stitt, Alameda, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/435,367

(22) Filed: Feb. 7, 2024

(51) Int. Cl.
*H02K 9/19* (2006.01)
*B60H 1/00* (2006.01)
*H02K 5/22* (2006.01)
*H02K 9/197* (2006.01)

(52) U.S. Cl.
CPC ......... *H02K 9/197* (2013.01); *B60H 1/00271* (2013.01); *B60H 1/00807* (2013.01); *H02K 5/225* (2013.01); *H02K 2209/00* (2013.01)

(58) Field of Classification Search
CPC .. H02K 9/00; H02K 9/06; H02K 9/08; H02K 9/16; H02K 9/19; H02K 9/197; H02K 5/00; H02K 5/12; H02K 5/128; H02K 5/1282; H02K 5/1285; H02K 5/132; H02K 5/22; H02K 5/225
See application file for complete search history.

(56) References Cited

U.S. PATENT DOCUMENTS

| 2,782,721 | A | * | 2/1957 | White | F04D 13/0666 |
| | | | | | 417/357 |
| 6,809,453 | B2 | * | 10/2004 | Narita | H02K 17/02 |
| | | | | | 310/268 |
| 2021/0194302 | A1 | | 6/2021 | Purchase et al. | |

FOREIGN PATENT DOCUMENTS

| CN | 1663837 A | * | 9/2005 |
| CN | 112491197 A | | 4/2022 |
| WO | WO2019241765 A1 | * | 12/2019 |

OTHER PUBLICATIONS

Judendorfer, Thomas, et al., "Conductivity measurements of electrical insulating oils", 2011 IEEE International Conference on Dielectric Liquids, Jun. 2011.

* cited by examiner

Primary Examiner — Tran N Nguyen
(74) Attorney, Agent, or Firm — Polygon IP, LLP (57) ABSTRACT

Described herein are immersion-cooled axial flux electric motors and methods of operating thereof. An immersion-cooled axial flux electric motor comprises a rotor and an immersion-cooled stator. The rotor comprises a set of magnets and a magnet support plate extending perpendicular to the motor axis. The set of magnets is attached to the magnet support plate and distributed about on the motor axis. The immersion-cooled stator comprises a cooling-fluid inlet, a cooling-fluid outlet, a set of stator windings, and a stator-sealed space. The set of stator windings is positioned within the stator-sealed space proximate to the set of magnets such that during the operation of the motor magnetic flux between the set of stator windings and the set of magnets is aligned substantially parallel to the axis of rotation of the rotor. The cooling-fluid inlet and the cooling-fluid outlet are fluidically coupled to the stator-sealed space.

20 Claims, 9 Drawing Sheets

IMMERSION-COOLED AXIAL FLUX ELECTRIC MOTORS AND METHODS OF OPERATING THEREOF

BACKGROUND

Most electric motors fall into one of two design categories, radial flux motors and axial flux motors. Most electric-motor applications thus far, including in electric vehicles, have utilized radial flux electric motors. In radial flux electric motors, magnets are distributed about a rotor's axis of rotation such that the direction of their magnetic fields are oriented perpendicular to the rotor e.g., by offsetting the motor windings and magnets radially. A stator surrounds but does not contact the rotor assembly and comprises electrical wire-wound cores arranged in such a way that the application of electrical current to the wire-wrapped cores causes the magnets to apply torque to cause the rotor to rotate. In axial flux electric motors, magnets are also arranged about the rotor, but the flux of their magnetic fields is oriented parallel with the rotor, e.g., by offsetting the motor windings and magnets axially. This allows for a much more compact design of the axial flux motor and, due to the smaller mass required to achieve a comparable power output, higher power densities (in comparison to radial flux motors). Both increased compactness and increased power density are desirable features for electric motors for many applications, including those in electric-powered transportation, for example, automobiles and aircraft. However, manufacturing challenges and thermal management have previously limited the wider adoption of axial flux electric motors.

Due in part to their compactness, managing the heat generated during the operation of axial flux electrical motors can be a challenge. While most (e.g., 95%+) of the electrical energy applied to operate an electric motor is converted to mechanical energy in the form of rotor rotation. However, a small percentage of the energy applied to the motor is converted to heat through a number of undesirable effects including resistance to current flow through the windings in the stator. It should be noted that electric motors can be sensitive to their operating temperatures. For example, exposure of a motor to increased temperature may lead to damage to temperature-sensitive components (e.g., magnets) affecting the performance or even the successful operation of the motor. In addition, increased temperature of, for example, metal wire windings in a motor stator may cause an increase in electrical resistance and a resulting decrease in operating efficiency.

Air cooling is sometimes used to remove the heat generated during the motor operation. However, due to the low heat capacity and metal-to-air heat transfer, air may provide insufficient cooling, especially for high-power applications such as automobiles and aircraft. Furthermore, motors can be often operated in enclosed spaces with limited airflow. Liquid cooling or, more generally, liquid-based thermal management of motors provides more efficient cooling in comparison to, e.g., air cooling because of the large heat capacities and heat transfer coefficient of many liquids in comparison to air. However, controlling the distribution of liquid within motors, in particular, compact axial flux electric motors, can be challenging. Furthermore, heat transfer from heat-generating components to cooling liquids may depend on various components positioned along this heat-transfer path.

What is needed are new immersion-cooled axial flux electric motors and methods for operating thereof.

SUMMARY

Described herein are immersion-cooled axial flux electric motors and methods of operating thereof. An immersion-cooled axial flux electric motor comprises a rotor and an immersion-cooled stator. The rotor comprises a set of magnets and a magnet support plate extending perpendicular to the motor axis. The set of magnets is attached to the magnet support plate and distributed about on the motor axis. The immersion-cooled stator comprises a cooling-fluid inlet, a cooling-fluid outlet, a set of stator windings, and a stator-sealed space. The set of stator windings is positioned within the stator-sealed space proximate to the set of magnets such that during the operation of the motor magnetic flux between the set of stator windings and the set of magnets is aligned substantially parallel to the axis of rotation of the rotor. The cooling-fluid inlet and the cooling-fluid outlet are fluidically coupled to the stator-sealed space.

Clause 1. An immersion-cooled axial flux electric motor comprising: a motor axis; a rotor comprising a set of magnets and a magnet support plate extending perpendicular to the motor axis, wherein the set of magnets is attached to the magnet support plate and distributed about the motor axis; an immersion-cooled stator comprising a cooling-fluid inlet, a cooling-fluid outlet, a set of stator windings, and a stator-sealed space, wherein: the set of stator windings are positioned with the stator-sealed space proximate to the set of magnets of the rotor such that during operation of the axial flux electric motor magnetic flux between the set of stator windings and the set of magnets is aligned substantially parallel to the motor axis, and the cooling-fluid inlet and the cooling-fluid outlet are fluidically coupled to the stator-sealed space.

Clause 2. The immersion-cooled axial flux electric motor of clause 1, wherein: the immersion-cooled stator further comprises stator end plates, winding-end units, a stator shroud, and a stator base collectively forming the stator-sealed space, the stator end plates extend perpendicular to the motor axis and are sealed against the stator base at a first end and against the stator shroud at a second end, positioned further away from the motor axis than the first end, the winding-end units are attached to opposite sides of the set of stator windings, extend into openings of the stator end plates, and sealed against the stator end plates within the openings of the stator end plates, and the stator shroud forms a ring about the motor axis.

Clause 3. The immersion-cooled axial flux electric motor of clause 2, wherein: the immersion-cooled stator further comprises a set of inlet distribution tubes fluidically coupled to the cooling-fluid inlet, the set of inlet distribution tubes are supported by the stator base and extend radially from the stator base, and the immersion-cooled stator further comprises an outlet collection tube extending through one of gaps between the set of stator windings within the stator-sealed space.

Clause 4. The immersion-cooled axial flux electric motor of clause 3, wherein the set of inlet distribution tubes has a constant circumferential offset from each other about the motor axis.

Clause 5. The immersion-cooled axial flux electric motor of clause 3, wherein the set of inlet distribution tubes extends radially into gaps between adjacent winding pairs of the set of stator windings within the stator-sealed space.

Clause 6. The immersion-cooled axial flux electric motor of clause 3, wherein each tube in the set of inlet distribution tubes comprises a set of distribution orifices, radially offset relative to each other on each tube in the set of inlet distribution tubes.

Clause 7. The immersion-cooled axial flux electric motor of clause 6, wherein the set of distribution orifices have different diameters on different tubes in the set of inlet distribution tubes.

Clause 8. The immersion-cooled axial flux electric motor of clause 6, wherein the set of distribution orifices have different diameters on a same tube in the set of inlet distribution tubes.

Clause 9. The immersion-cooled axial flux electric motor of clause 3, wherein the set of inlet distribution tubes comprises at least 18 tubes.

Clause 10. The immersion-cooled axial flux electric motor of clause 3, wherein an end of each tube in the set of inlet distribution tubes, proximate to the stator shroud is sealed.

Clause 11. The immersion-cooled axial flux electric motor of clause 3, wherein the outlet collection tube comprises a collection-tube opening positioned proximate to the stator shroud.

Clause 12. The immersion-cooled axial flux electric motor of clause 3, wherein: the stator base comprises an inlet fluidic pathway fluidically coupling the cooling-fluid inlet and each tube in the set of inlet distribution tubes, and the stator base comprises an outlet fluidic pathway fluidically coupling the cooling-fluid outlet and the outlet collection tube.

Clause 13. The immersion-cooled axial flux electric motor of clause 12, wherein a portion of the inlet fluidic pathway has a ring shape, centered about the motor axis and providing distribution to a thermal fluid to the set of inlet distribution tubes.

Clause 14. The immersion-cooled axial flux electric motor of clause 1, wherein: the immersion-cooled stator further comprises a terminal cover and contact terminals, the contact terminals are connected to the set of stator windings and protrude through the terminal cover, the cooling-fluid inlet and the cooling-fluid outlet protrude through the terminal cover.

Clause 15. An electric vehicle comprising: a battery; an inverter; a vehicle cooling system comprising a radiator, a pump, and a system controller; and an immersion-cooled axial flux electric motor, electrically coupled to the battery and the inverter and comprising: a motor axis; a rotor comprising a set of magnets and a magnet support plate extending perpendicular to the motor axis, wherein the set of magnets is attached to the magnet support plate and distributed about on the motor axis; an immersion-cooled stator comprising a cooling-fluid inlet, a cooling-fluid outlet, a set of stator windings, and a stator-sealed space, wherein: the cooling-fluid inlet and the cooling-fluid outlet are fluidically coupled to the vehicle cooling system, the set of stator windings are positioned with the stator-sealed space proximate to the set of magnets of the rotor such that during operation of the axial flux electric motor magnetic flux between the set of stator windings and the set of magnets is aligned substantially parallel to the motor axis, and the cooling-fluid inlet and the cooling-fluid outlet are fluidically coupled to the stator-sealed space.

Clause 16. The electric vehicle of clause 15, wherein the system controller is configured to record an initial temperature input and an exit temperature input and configure the pump to operate at a speed sufficient to maintain difference between the initial temperature input and the exit temperature input within a pre-defined range.

Clause 17. The electric vehicle of clause 15, wherein the vehicle cooling system is further fluidically coupled to at least one of the battery and the inverter.

Clause 18. A method of operating an immersion-cooled axial flux electric motor on an electric vehicle, the method comprising: providing an immersion-cooled axial flux electric motor comprising: a motor axis; a rotor comprising a set of magnets and a magnet support plate extending perpendicular to the motor axis, wherein the set of magnets is attached to the magnet support plate and distributed about on the motor axis; an immersion-cooled stator comprising a cooling-fluid inlet, a cooling-fluid outlet, a set of stator windings, and a stator-sealed space, wherein: the set of stator windings are positioned with the stator-sealed space proximate to the set of magnets of the rotor such that during operation of the axial flux electric motor magnetic flux between the set of stator windings and the set of magnets is aligned substantially parallel to the motor axis, and the cooling-fluid inlet and the cooling-fluid outlet are fluidically coupled to the stator-sealed space; filling the immersion-cooled axial flux electric motor with a thermal fluid by pumping the thermal fluid into the cooling-fluid inlet and until the thermal fluid is displaced from the cooling-fluid outlet; and operating the immersion-cooled axial flux electric motor by supplying electric power to the set of stator windings and by pumping the thermal fluid into the cooling-fluid inlet, through the stator-sealed space, and out of the cooling-fluid outlet.

Clause 19. The method of clause 18, wherein: the immersion-cooled stator further comprises a set of inlet distribution tubes fluidically coupled to the cooling-fluid inlet, the set of inlet distribution tubes are supported by a stator base and extend radially from the stator base, the immersion-cooled stator further comprises an outlet collection tube extending through one of gaps between the set of stator windings within the stator-sealed space, and the outlet collection tube is oriented substantially vertically, defined by a gravitational force, while filling the immersion-cooled axial flux electric motor with the thermal fluid.

Clause 20. The method of clause 19, wherein: the outlet collection tube comprises a collection-tube opening positioned proximate to a stator shroud, and the collection-tube opening in at a highest position, defined by the gravitational force, while filling the immersion-cooled axial flux electric motor with the thermal fluid.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

As noted above, sufficiently cooling an axial flow electric motor may be difficult, especially during high-power output operation. Immersion of heat-generating components in circulating coolant liquid may provide significant advantages over air-cooled thermal management and other forms of liquid-cooled thermal management. Air-cooled thermal management, or removing heat by contacting heat-generating components with circulating air, has significant drawbacks in some motor installations. For example, the transfer of heat to air may be too slow to adequately cool the motor under high-power operation due to the relatively low heat capacity of air and/or the relatively low surface area of components exposed to air. Additionally, contact of air with heat-generating components may be significantly restricted due to the compact nature of axial flux electric motors relative to typical radial flux electric motors or the encasing of the motor in a protective housing. Some forms of liquid-cooled thermal management may also present challenges. For example, contacting surfaces of components of the stator with a heat-conductive channel conducting thermal fluid removes heat but may not remove heat effectively from all parts of the stator. For example, the thermal fluid does not remove heat as effectively from the last component it contacts as it does the first because the heat transfer varies with the temperature difference between the component and the temperature of the fluid at the time of contact. The temperature of the thermal fluid will be much closer to the temperature of the last component it contacts than the first because of the heat it has accepted from previously contacted components. Additionally, this approach relies on heat transfer through each component from one side to another where the channel conducting the thermal fluid makes contact. Further, such circuits are likely to have locations where gas bubbles in the cooling fluid collect and are difficult to remove. Immersion cooling is superior for cooling axial flux electric motors. For example, due to their compact construction, integration of passages for conducting cooling fluid presents design challenges not present when cooling liquid can instead flow directly between components. This can be especially true in locations close to the rotor, where components are more closely spaced. Also, an axial flux electric motor operates more efficiently the closer the magnets of the rotor are to the coil surface, further constraining possible locations for the integration of cooling fluid passages. The key challenge to applying immersion cooling in axial flux electric motors may be the sealing of the thermal fluid within the motor.

Described herein are immersion-cooled axial flux electric motors and methods of operating thereof. Specifically, heat-generating components of the stator come in direct contact with a thermal fluid (e.g., mineral oil, transformer oil). Due to the contact with various electrical components of the immersion-cooled axial flux electric motor 100 (e.g., operating at different potentials), the thermal fluid may be electronically non-conductive. For example, the electrical conductivity of the thermal fluid can be less than $1 \times 10^{-10}$ S/m, less than $1 \times 10^{-12}$ S/m, and even less than $1 \times 10^{-12}$ S/m. For comparison, the electrical conductivity of a typical coolant used in internal combustion engines (ICE) is at least 0.1 S/m or even at least 1 S/m. As such, traditional water-glycol-based thermal fluids are not applicable for immersion cooling of the immersion-cooled axial flux electric motor 100.

Figure 1A:
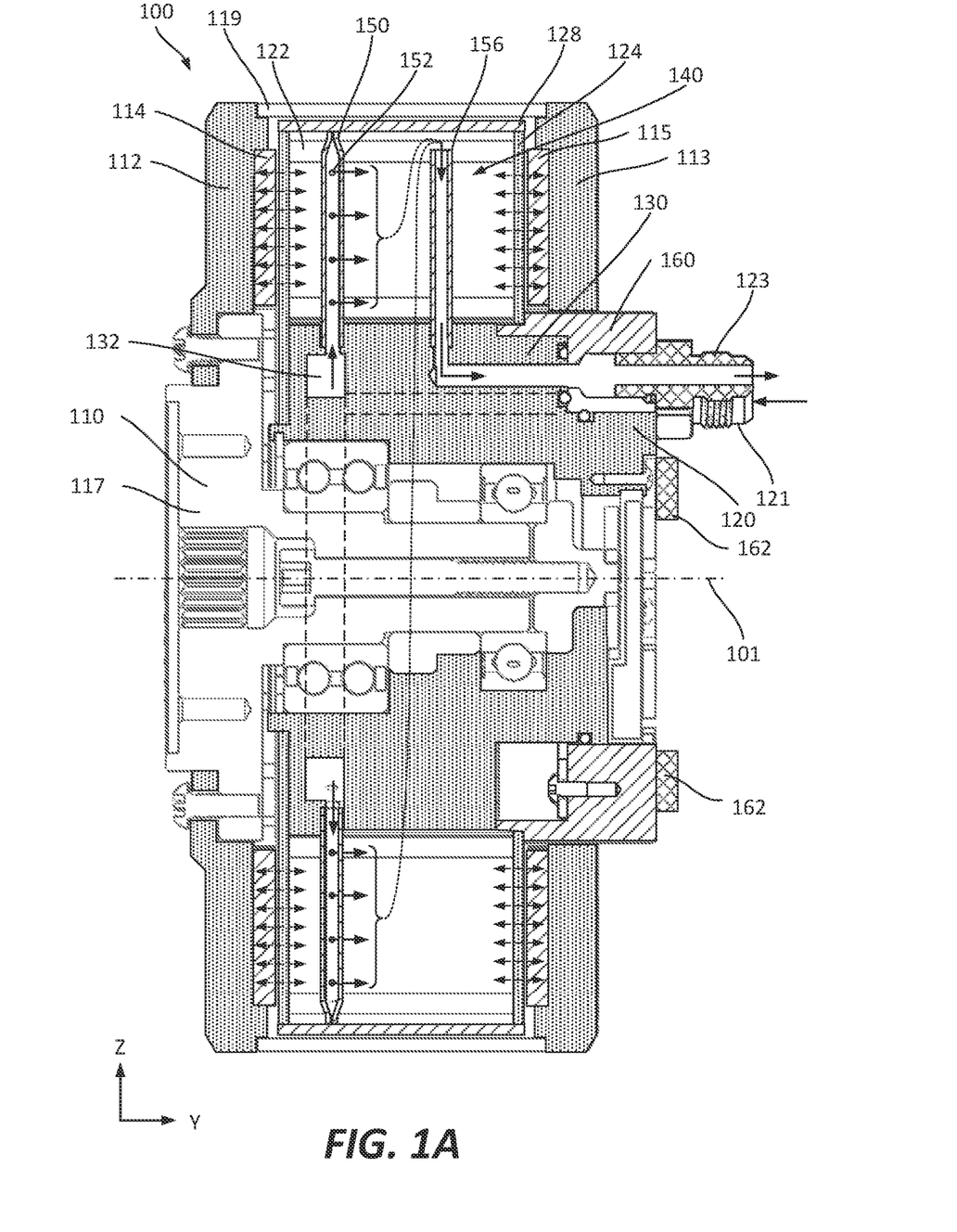
FIG. 1A is a cross-section view of an immersion-cooled axial flux electric motor illustrating some internal components of the motor such as a rotor and an immersion-cooled stator, in accordance with some examples.
Figure 1B:
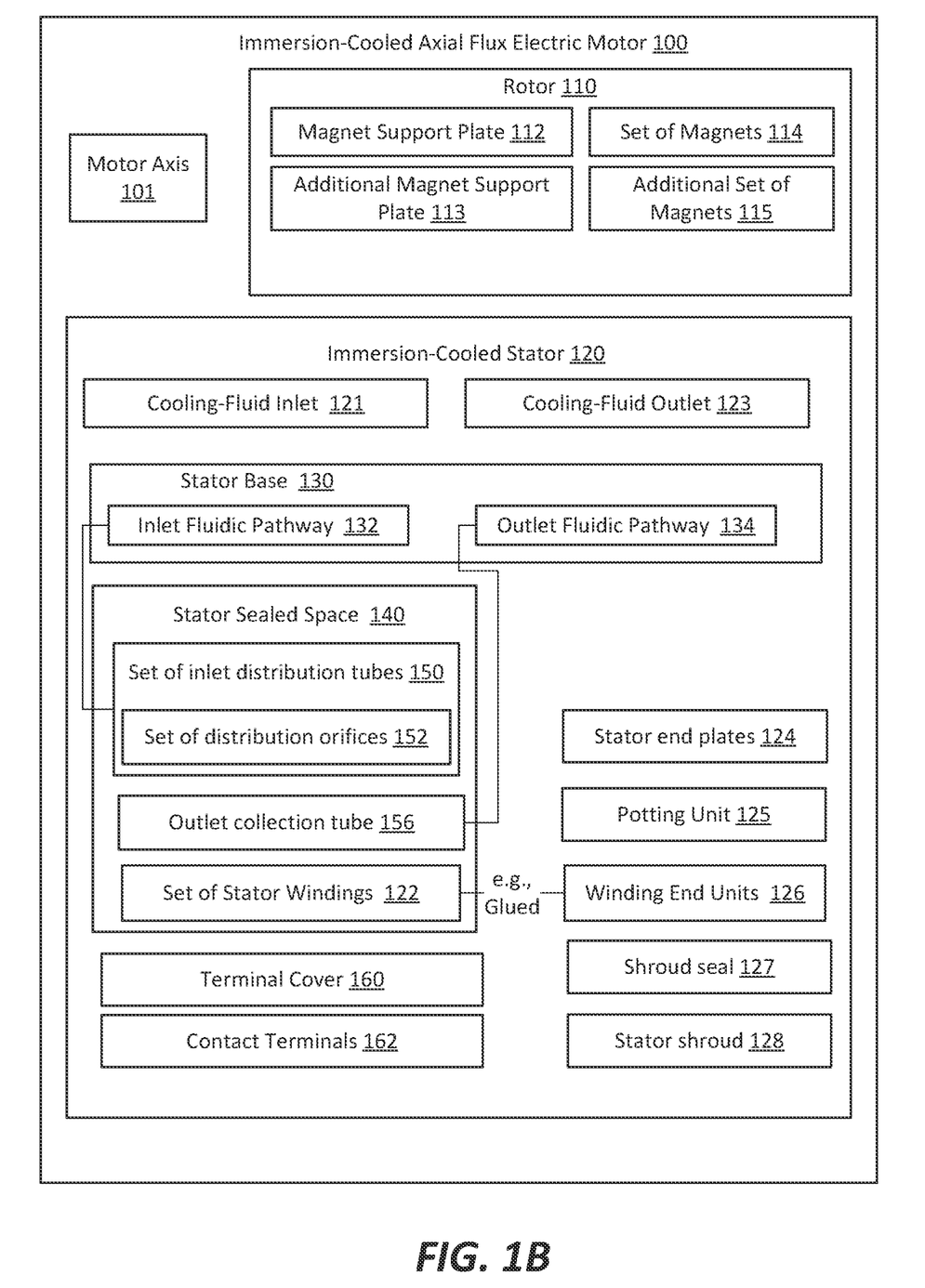
FIG. 1B is a block diagram of an immersion-cooled axial flux electric motor showing some relationships among the motor's components, in accordance with some examples.

As shown in FIGS. 1A and 1B, an immersion-cooled axial flux electric motor 100 comprises a motor axis 101 (extending along/parallel to the Y-axis), a rotor 110, and an immersion-cooled stator 120. The rotor 110 rotates about the motor axis 101. The rotor 110 comprises a set of magnets 114 and a magnet support plate 112 extending perpendicular to the motor axis 101. The set of magnets 114 is attached to the magnet support plate 112 and is distributed about the motor axis 101. The immersion-cooled stator 120 comprises a cooling-fluid inlet 121, a cooling fluid outlet 123, a set of stator windings 122, and a stator-sealed space 140. The set of stator windings 122 are positioned within the stator-sealed space 140 proximate to the set of magnets 114 of the rotor 110 such that during operation of the axial flux electric motor 100 magnetic flux between the set of stator windings 122 and the set of magnets 114 is aligned substantially parallel to the motor axis 101. The cooling fluid inlet 121 and the cooling fluid outlet 123 are fluidically coupled to the stator-sealed space 140 such that a thermal fluid can be circulated through the stator-sealed space 140 and be in direct contact with the set of stator windings 122 during the operation of the immersion-cooled axial flux electric motor 100. As such, the heat is directly transferred from the set of stator windings 122 to the thermal fluid without any other intermediate components. The circulation of the thermal fluid can be increased to increase the heat transfer (e.g., when increasing the motor's output). Without being restricted to any particular theory, it is believed that the set of stator windings 122 produces the most heat during the motor operation. Other heat-generating components, e.g., wiring to the set of stator windings 122, can be also in direct contact/immersively cooled by the thermal fluid. Furthermore, other heat-generating components can be cooled conductively transferring the heat to other (immersively-cooled) components.

Electric motors can be very sensitive to operating temperatures. These temperatures can be influenced by the environment and by the motor's operation (e.g., self-heating). For example, the temperature coefficient of copper is about 0.00404 $C^{-1}$. Therefore, increasing the temperature of copper windings by 50° C. will cause the resistivity to increase by about 20%. This will cause an undesirable decrease in the efficiency of the motor and an increase in heat generated by electric current passing through the windings without temperature control of the windings. Liquid-based thermal management provides efficient ways of controlling the temperature of components of axial flux electric motors. However, the thermal coupling of electric motors and thermal fluid can be challenging. The immersion cooling of axial flux stators brings windings in direct contact with thermal fluids, which is beneficial for thermal transfer. The key challenges include controlling the distribution and flow of thermal fluids around components of the axial flux motor. End portions of the windings proximate to the set of magnets are potted with potting compound and, for efficient operation of the axial flux electric motor, should be as close as possible without touching the set of magnets. With immersion cooling, the seal to enclose the stator space in which the windings are positioned must both prevent undesirable leakage of thermal fluid from the immersion-cooled stator space and accommodate the proximity of the end portions of the windings to the set of magnets.

Examples of Immersion-Cooled Axial Flux Electric Motors

FIG. 1A is a schematic cross-section illustration of an immersion-cooled axial flux electric motor 100, in accordance with some examples. FIG. 1B is a corresponding block diagram showing relationships between some components of the immersion-cooled axial flux electric motor 100. Shown are the motor axis 101, the rotor 110, and the immersion-cooled stator 120. As noted above, the rotor 110 comprises a magnet support plate 112 extending perpendicular to the motor axis 101. A set of magnets 114 is attached to the magnet support plate 112 and is distributed about the motor axis 101. In some examples, the set of magnets 114 is attached to the support plate 112 using an adhesive. However, other attachment methods (e.g., fasteners/threaded fasteners, press fit, etc) are also within the scope.

In some examples, the rotor 110 further comprises an additional magnet support plate 113 extending perpendicular to the motor axis 101 and positioned opposite the immersion-cooled stator 120 along the motor axis 101. An additional set of magnets 115 is attached to the additional magnet support plate 113 and is distributed about the motor axis 101. The two magnet support plates (i.e., the additional magnet support plate 113 and the magnet support plate 112) are connected to each other by a stator shaft 117 and/or a stator enclosure 119. In these examples, the additional set of magnets 115 applies a torque to rotate the rotor during the operation of the immersion-cooled axial flux electric motor 100 in addition to that applied by the set of magnets 114. The immersion-cooled stator 120 is positioned between the two magnet support plates (i.e., the additional magnet support plate 113 and the magnet support plate 112) such that the 117 protrudes through the immersion-cooled stator 120.

Figure 2A:
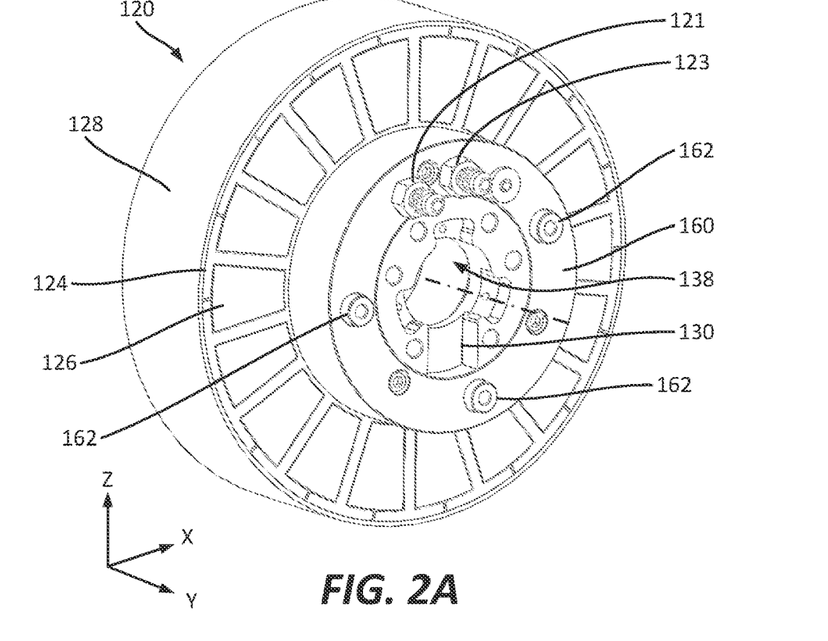
FIG. 2A is a perspective view of one side of the immersion-cooled stator of the immersion-cooled axial flux electric motor in FIG. 1A, in accordance with some examples.

The immersion-cooled stator 120 comprises a cooling-fluid inlet 121, a cooling-fluid outlet 123, a set of stator windings 122, and a stator-sealed space 140. The cooling-fluid inlet 121 and the cooling fluid outlet 123 both are fluidically coupled to the stator-sealed space 140 and used to supply the thermal fluid into the stator-sealed space 140 and remove the thermal fluid from the stator-sealed space 140. In FIG. 1A, the cooling-fluid outlet 123 is partially obscured by the cooling-fluid inlet 121. FIG. 2A shows the relative positions of the cooling fluid inlet 121 and the cooling fluid outlet 123 and their positions relative to the immersion-cooled stator 120. As further described below with reference to FIG. 4, the cooling-fluid inlet 121 and the cooling fluid outlet 123 can be fluidically coupled to the vehicle cooling system 430 (used for pumping the thermal fluid through the immersion-cooled stator 120 or, more specifically, through the stator-sealed space 140 of the immersion-cooled stator 120).

Each one of the stator windings 122 comprises windings of a conductive wire electrically connected with two of the contact terminals 162 in such a way that passage of electrical current through each winding induces a magnetic field. The wire may comprise a metal of suitable electrical conductivity such as copper, nickel, and other suitable conductive materials. The stator windings 122 are shielded by winding-end units 126 (on each side along the motor axis 101). In some examples, a set of stator windings 122 comprises 18 stator windings. In some examples, the set of stator windings comprises 4, 8, 12, 21, or even 36 stator windings. The winding end units 126 comprise a potting compound. The potting compound is chemically resistant to thermal fluid 438 and maintains sufficient dimensional stability throughout the designed operating temperature range of the immersion-cooled axial flux electric motor 100 to maintain the seal at the interface with the stator end plate 124. The thickness of the winding end unit 126 measured in the direction of the motor axis 101 may be at least 0.5 millimeters, at least 1 millimeter, at least 2 millimeters, or even at least 5 millimeters.

Referring to FIGS. 1A and 1B, in some examples, the immersion-cooled stator 120 further comprises stator end plates 124, winding-end units 126, a stator shroud 128, and a stator base 130. These components collectively form the stator-sealed space 140. These components are also shown in FIGS. 2A-2D and 3A-3D. The stator end plates 124 extend perpendicular to the motor axis 101 and are sealed against the stator base 130 at the first end and against the stator shroud 128 at the second end, positioned further away from the motor axis 101 than the first end. For example, FIG. 2C illustrates a shroud seal 127, positioned between and sealing the stator shroud 128 and stator end plates 124. For example, an epoxy potting compound can be used for these purposes. These seals ensure that the thermal fluid is contained within the immersion-cooled stator 120 or, more specifically, within the stator-sealed space 140. As such, the thermal fluid does not interfere with the operation of the rotor 110.

The stator windings 122 are enclosed by the set of potting units 125 as shown in FIG. 2C. The set of potting units 125 may comprise materials that include but are not limited to epoxy and polyurethane.

Figure 2B:
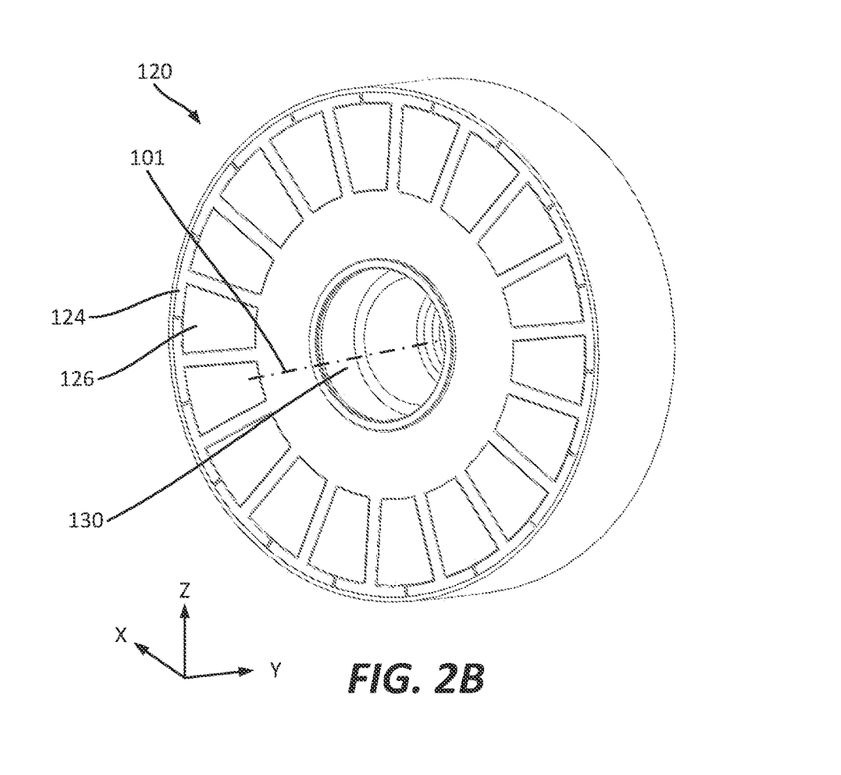
FIG. 2B is a perspective view of the opposite side of the immersion-cooled stator of FIG. 2A, in accordance with some examples.
Figure 2C:
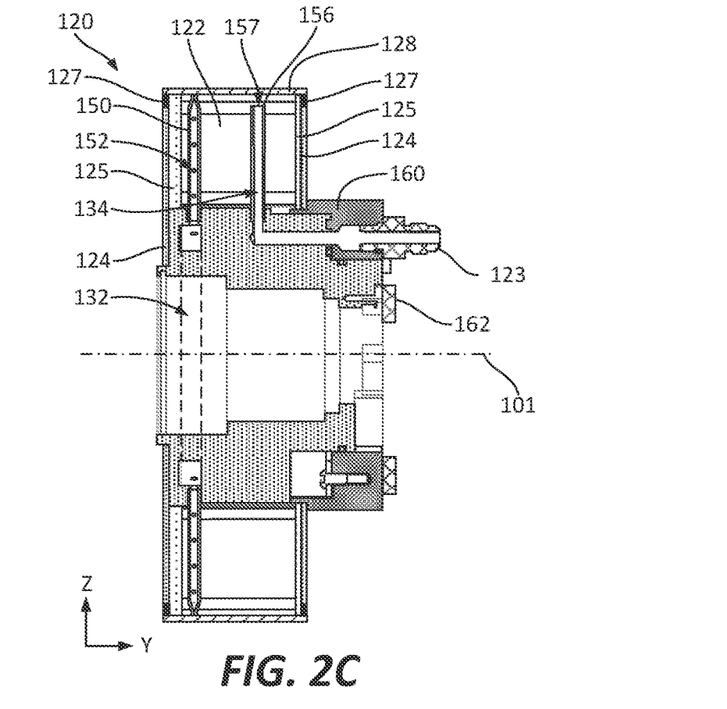
FIG. 2C is a cross-section view of an immersion-cooled stator in FIG. 2A, illustrating outlet features of the stator, in accordance with some examples.
Figure 2D:
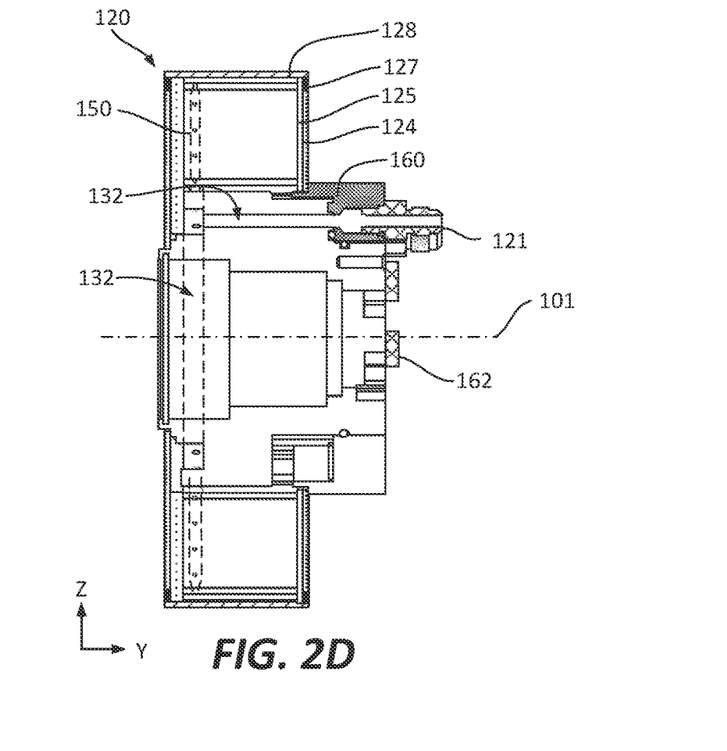
FIG. 2D is another cross-section view of an immersion-cooled stator in FIG. 2A, showing inlet features of the stator, in accordance with some examples.
Figure 3A:
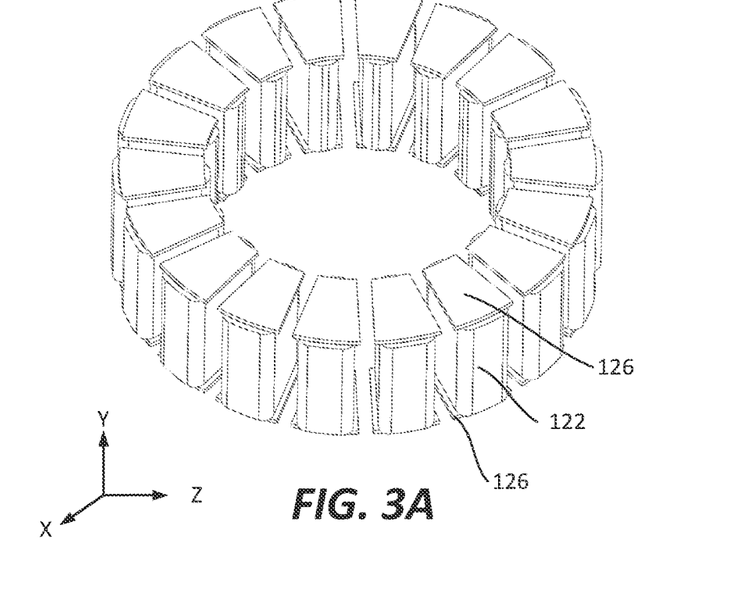
FIG. 3A is a perspective view of the stator windings of the immersion-cooled stator of FIG. 2A with the winding-end units attached to opposite sides of the stator windings, in accordance with some examples.

As shown in FIGS. 2A-2B and 3A, each one of the stator windings 122 has two winding end lamination units 126, each one affixed to one of the two distal ends along the y-axis. The winding end lamination units 126 on one side of the immersion-cooled stator 120 are co-planar with each other and parallel to the winding end lamination units 126 on the other side of the immersion-cooled stator 120. The stator windings 122 are positioned within the stator-sealed space 140 and do not make physical contact with one another.

Figure 3B:
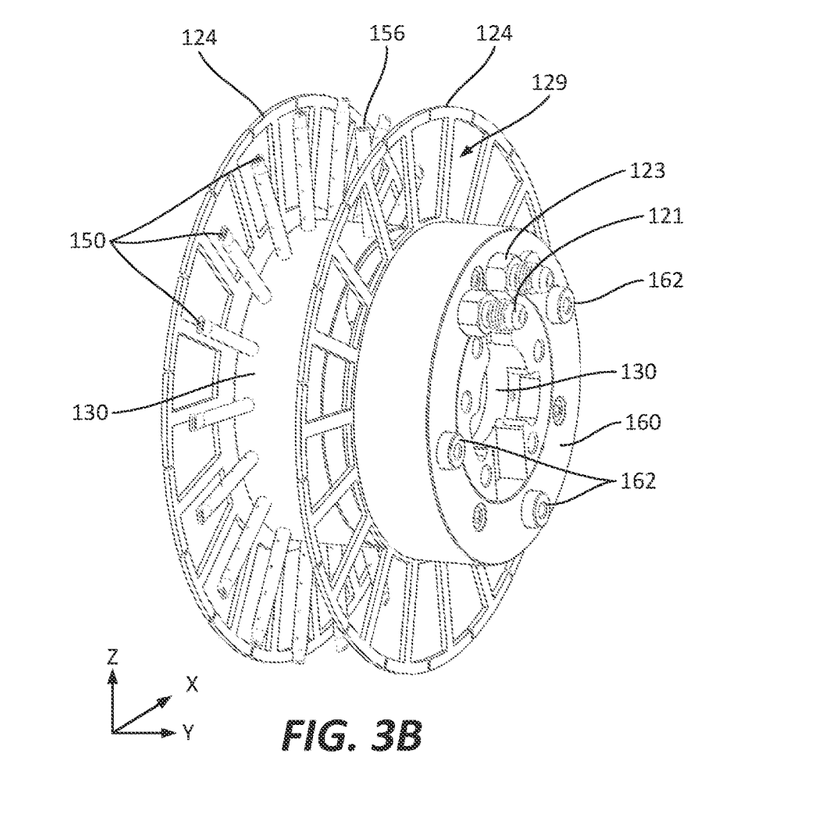
FIG. 3B is a perspective view of the stator base, stator end plates, set of inlet distribution tubes, outlet collection tube, and terminal cover of the immersion-cooled stator of FIG. 2A, illustrating positions of the tubes relative to other components, in accordance with some examples.

Referring to FIGS. 2A-2B and 3B, the winding-end units 126 extend into openings 129 of the stator end plates 124 and are sealed against the stator end plates 124 within the openings 129 of the stator end plates 124, e.g., using epoxy potting. Referring to FIGS. 2A-2D, the stator shroud 128 forms a ring about the motor axis 101.

Referring to FIG. 1A, the set of stator windings 122 are positioned within the stator-sealed space 140 proximate to the set of magnets 114 of the rotor 110 such that during operation of the axial flux electric motor 100, the magnetic flux between the set of stator windings 122 and the set of magnets 114 is aligned substantially parallel to the motor axis 101 (extending along/parallel to the Y-axis). It should be noted that the closer the set of stator windings 122 are positioned to the set of magnets 114, the more energy efficient the operation of the immersion-cooled axial flux electric motor 100 will be. However, at least an air gap must be maintained between the set of stator windings 122 and the set of magnets 114 for the motor to operate. As shown in FIG. 1A, the immersion-cooled axial flux electric motor 100 comprises an air gap and stator end plates 124 positioned between the windings and magnets.

Figure 3C:
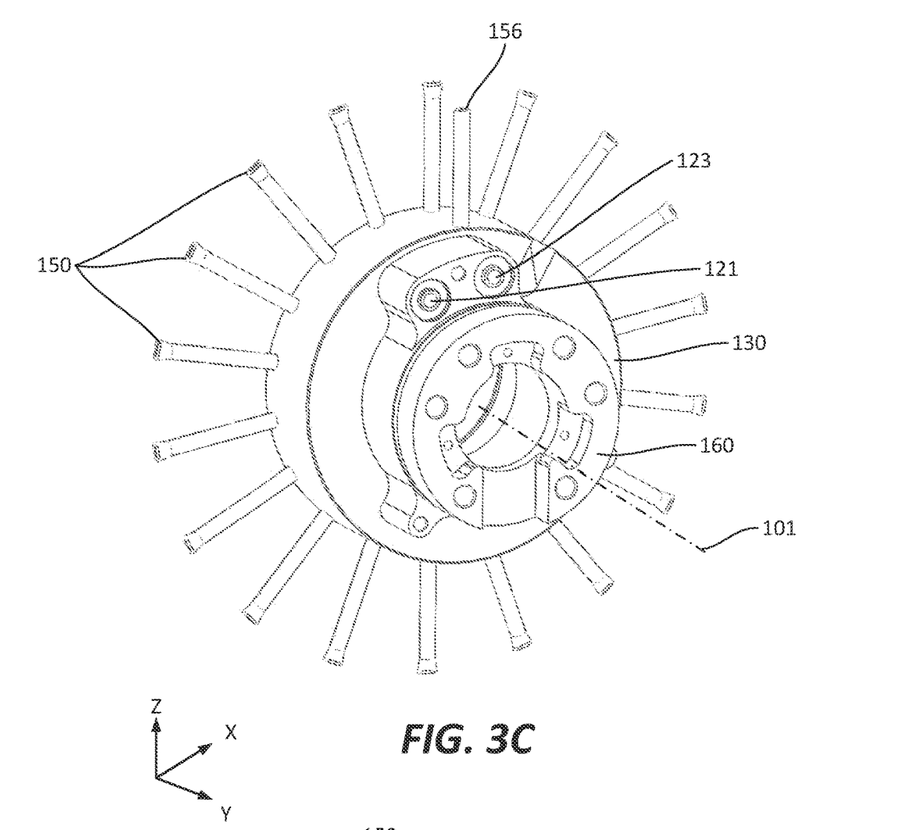
FIG. 3C is a perspective view of the stator base, set of inlet distribution tubes, outlet collection tube, and terminal cover of the immersion-cooled stator of FIG. 2A, illustrating positions of the tubes relative to other components, in accordance with some examples.
Figure 3D:
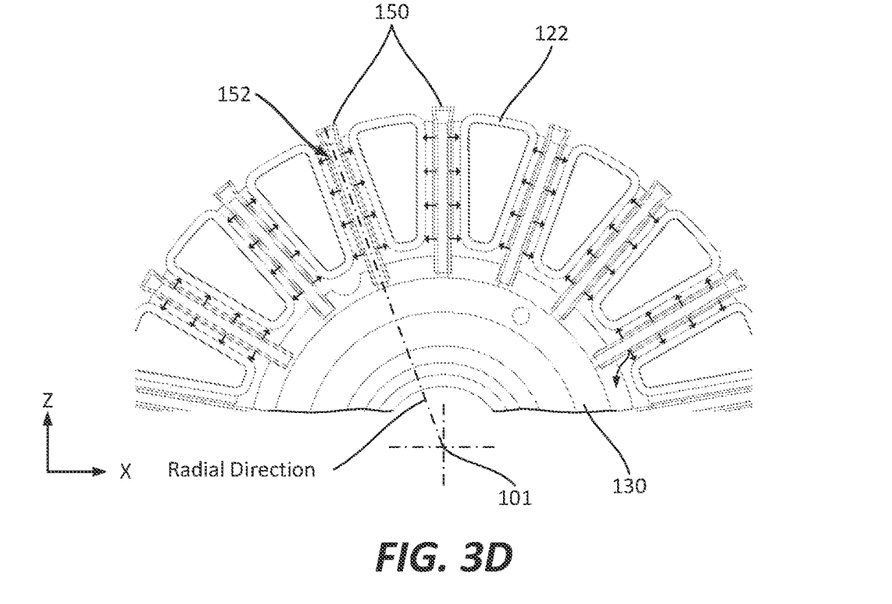
FIG. 3D is a perspective view of the stator base, set of inlet distribution tubes, and stator windings of an immersion-cooled axial flux electric motor, in accordance with some examples.

Referring to FIGS. 1A, 2C, 2D, 3B-3D, in some examples, the immersion-cooled stator 120 further comprises a set of inlet distribution tubes 150 and an outlet collection tube 156. As shown in the cross-section in FIG. 2D and schematically in FIG. 1B, the set of inlet distribution tubes 150 is fluidically coupled to the cooling-fluid inlet 121. More specifically, the stator base 130 may comprise an inlet fluidic pathway 132 that fluidically couples the cooling-fluid inlet 121 and each tube in the set of inlet distribution tubes 150. The set of inlet distribution tubes 150 may be supported by the stator base 130 and extend radially from the stator base 130, as shown in FIG. 3C. The set of inlet distribution tubes 150 may extend radially from the stator base 130 and perpendicular to the motor axis 101. In some further examples, the set of inlet distribution tubes 150 extends radially into gaps between adjacent winding pairs of the set of stator windings 122 within the stator-sealed space 140, as shown in FIG. 3D. In some examples, a portion of the inlet fluidic pathway 132 has a ring shape, centered about the motor axis 101, and provides distribution to a thermal fluid 438 to the set of inlet distribution tubes 150, as shown in FIG. 3B.

The outlet collection tube 156 is fluidically coupled to the cooling-fluid outlet 123. More specifically, the stator base 130 may comprise an outlet fluidic pathway 134 that fluidically couples the outlet collection tube 156 and the cooling-fluid outlet 123, as shown in cross-section in FIG. 2C. In some examples, the outlet collection tube 156 extends through one of the gaps between the set of stator windings 122 within the stator-sealed space 140. In some examples, the outlet collection tube 156 comprises a collection tube opening 157 positioned proximate to the stator shroud 128. In some further examples, the immersion-cooled axial flux electric motor 100 may be installed in an orientation in which the outlet collection tube 156 extends from the stator base 130 substantially opposite the gravitational vertical (which may be referred to as an upmost orientation). In these examples, gas (which is present inside the stator-sealed space 140 prior to filling with the thermal fluid) will be pushed to the opening of the outlet collection tube 156 and be removed from the stator-sealed space 140 with the flow of thermal fluid. In some further examples, the set of inlet distribution tubes 150 has a constant circumferential offset from each other about the motor axis 101. In some examples, the set of inlet distribution tubes 150 comprises at least 4 tubes, at least 9 tubes, at least 18 tubes, or even at least 36 tubes.

In some examples, the end of each tube in the set of inlet distribution tubes 150, proximate to the stator shroud 128, is sealed. For example, each tube in the set of inlet distribution tubes 150 comprises a set of distribution orifices 152, radially offset relative to each other on each tube in the set of inlet distribution tubes 150. Each set of distribution orifices 152 may comprise 2, 3, 4, 5, 8, or even 10 individual orifices. This sealed end ensures that the thermal fluid is pushed through the set of distribution orifices 152. The location of the set of inlet distribution tubes 150 and the location of the set of distribution orifices 152 (on the set of inlet distribution tubes 150) ensures the uniform distribution of the thermal fluid within the stator-sealed space 140.

Figure 3E:
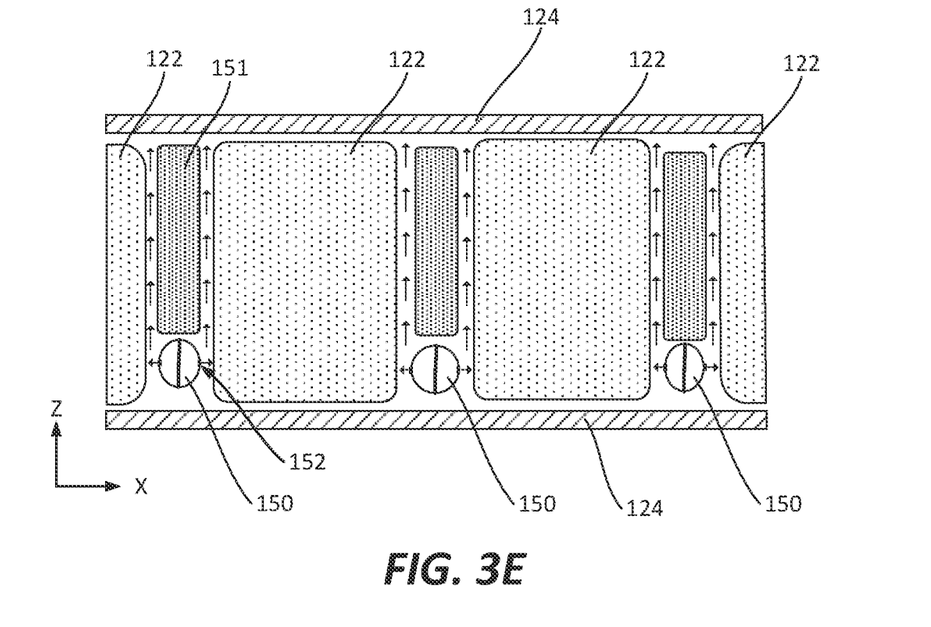
FIG. 3E is a top view of the stator windings as well as the set of inlet distribution tubes and the stator winding fillers positioned between pairs of adjacent windings of an immersion-cooled axial flux electric motor, in accordance with some examples.

The dotted lines in FIG. 1A and arrows in FIGS. 3D and 3E indicate possible flow pathways for the thermal fluid exiting from a set of distribution orifices 152, flowing through the stator sealed space and between individual ones of the set of stator windings 122, and into the outlet collection tube 156. In some examples, the set of inlet distribution tubes 150 can be positioned proximate to one of the stator end plates 124, e.g., as shown in FIG. 3E. To ensure the sufficient linear flow of the thermal fluid proximate to the surface of the the set of stator windings 122 (while the thermal fluid travels between each pair of adjacent stator windings 122, a stator winding filler 151 may be positioned into each space between each pair of adjacent stator windings 122, together with one of the distribution tubes 150. Specifically, the stator winding filler 151 may be positioned between the distribution tube 150 and the other one of the stator end plates 124 as shown in FIG. 3E.

The immersion-cooled stator 120 further comprises a terminal cover 160. Shown in FIG. 2A is the placement of the terminal cover 160 on the immersion-cooled stator 120 relative to the stator end plate 124 and the stator base 130, in accordance with some examples. The terminal cover 160 may comprise a material of suitable dimensional stability and electrical resistivity. In some examples, the terminal cover 160 comprises a plastic material. The terminal cover 160 comprises contact terminals 162. The contact terminals 162 are electrically connected to the set of stator windings 122 and protrude through the terminal cover 160. In some examples, contact terminals 162 are electrically isolated from the other components of the terminal cover 160 such that these components are neutral. In some examples, the immersion-cooled axial flux electric motor 100 is a three-phase AC motor and the contact terminals 162 comprises three contacts, one for each phase of the AC power supplied to the motor. In other examples, the immersion-cooled axial flux electric motor 100 is a one-phase AC motor or a DC motor. In these examples, the set of contact terminals 162 comprises two contacts. In addition, the cooling-fluid inlet 121 and the cooling-fluid outlet 123 protrude through the terminal cover 160. The cooling-fluid inlet 121 and the cooling-fluid outlet 123 are used for the fluidic connection of the stator-sealed space 140 to other components of the electric vehicle 400, e.g., a vehicle cooling system 430. Specifically, the cooling-fluid inlet 121 allows thermal fluid 438 to flow from the vehicle cooling system 430 into the stator-sealed space 140, and the cooling-fluid outlet 123 allows thermal fluid 438 to flow out of the stator-sealed space 140 and to the vehicle cooling system 430. In some examples, the terminal cover 160 further comprises a position sensor cavity 138 configured to accommodate one or more sensors configured to determine the rotational position of the rotor 110 relative to the immersion-cooled stator 120.

Overall, each one of the set of stator windings 122 is immersed/comes in contact with the thermal fluid provided by the set of cooling-fluid inlet tubes 150. Each winding in the set of stator windings 122 is cooled or, more generally, thermally managed by thermal fluid 438 surrounding it on four sides thereby ensuring more a uniform temperature profile within the winding (e.g., in comparison to one-sided cooling that may be provided by physical contact with a line carrying thermal fluid).

Examples of Electric Vehicles

Figure 4:
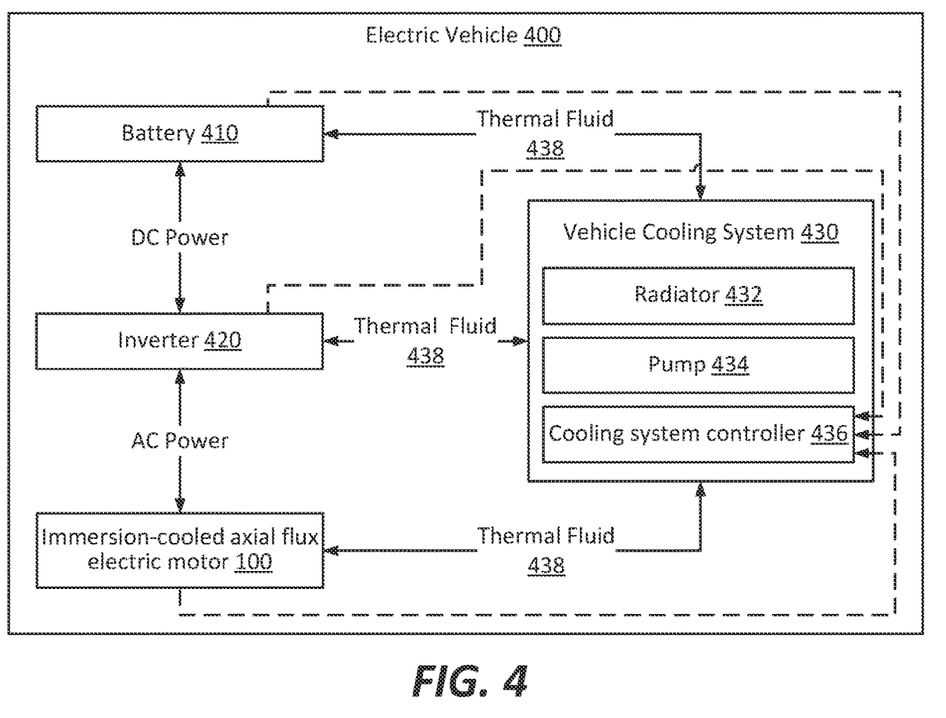
FIG. 4 is a block diagram of an electric vehicle comprising an immersion-cooled axial flux electric motor and other components connected to the immersion-cooled axial flux electric motor, in accordance with some examples.

Immersion-cooled axial flux electric motors described herein can be used in electric vehicles. FIG. 4 is a block diagram of an electric vehicle 400 in accordance with some examples. The electric vehicle 400 comprises a battery 410, an inverter 420, a vehicle cooling system 430, and an immersion-cooled axial flux electric motor 100. A vehicle system controller may be communicatively connected with the immersion-cooled axial flux electric motor 100, the battery 410, and the inverter 420.

The battery 410 may be electrically connected with the inverter 420. The inverter 420 may be configured to receive electrical energy from the battery in the form of direct current (DC). The inverter 420 may also be electrically connected to the immersion-cooled axial flux electric motor 100. The inverter 420 may be configured to provide electrical power to the immersion-cooled axial flux electric motor 100 in the form of alternating current (AC).

The vehicle cooling system 430 comprises a radiator 432, a pump 434, and a cooling system controller 436. The radiator 432 is configured to lower the temperature of thermal fluid 438 passing through the radiator 432 by taking heat from the thermal fluid 438 and radiating it to the environment.

The immersion-cooled axial flux electric motor 100 is electrically coupled to the battery 410 and the inverter 420. Various aspects of the immersion-cooled axial flux electric motor 100 are described above. The cooling-fluid inlet 121 and the cooling-fluid outlet 123 (that are fluidically coupled to the stator-sealed space 140 of the immersion-cooled stator 120) are also coupled to the vehicle cooling system 430. In some examples, the vehicle cooling system 430 is also fluidically coupled to one or both of the battery 410 and the inverter 420 (e.g., for cooling these components).

In some examples, the cooling system controller 436 is configured to record an initial temperature input and an exit temperature input and configure the pump 434 to operate at a speed sufficient to maintain the difference between the initial temperature input and the exit temperature input within a pre-defined range. Initial temperature input and an exit temperature input may be measured by temperature sensors placed in the flow of thermal fluid 438 near each of the cooling-fluid inlet 121 and the cooling-fluid outlet 123. In some examples, the vehicle cooling system 430 is further fluidically coupled to at least one of the battery 410 and the inverter 420.

Examples of Methods of Operating Immersion-Cooled Axial Flux Electric Motors

Figure 5:
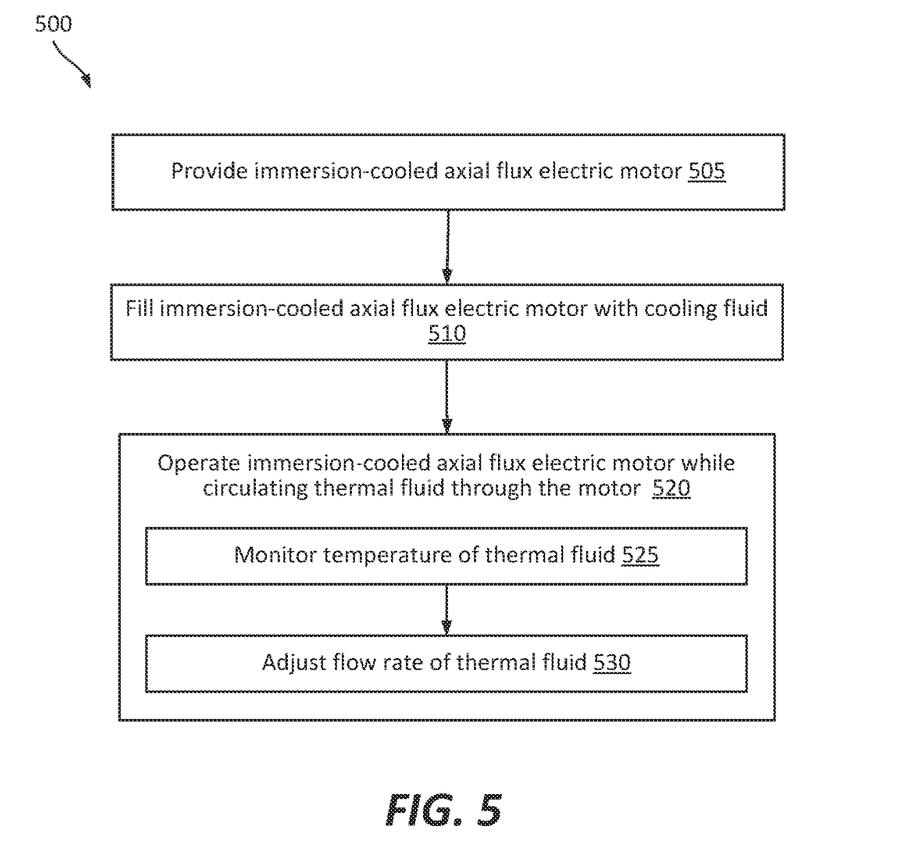
FIG. 5 is a process flowchart of a method for operating an immersion-cooled axial flux electric motor, e.g., as a part of an electric vehicle, in accordance with some examples.

FIG. 5 is a process flowchart corresponding to method 500 of operating an immersion-cooled axial flux electric motor 100 on an electric vehicle 400, in accordance with some examples. Method 500 may commence with (block 505) providing an immersion-cooled axial flux electric motor 100. Various examples of the immersion-cooled axial flux electric motor 100 are described above. In some examples, the immersion-cooled axial flux electric motor 100 comprises a motor axis 101, a rotor 110, and an immersion-cooled stator 120. The rotor 110 is configured to rotate about the motor axis 101 relative to the immersion-cooled stator 120. The rotor 110 comprises a set of magnets 114 and a magnet support plate 112 extending perpendicular to the motor axis 101. The set of magnets 114 is attached to the magnet support plate 112 and distributed about on the motor axis 101. The immersion-cooled stator 120 comprises a cooling-fluid inlet 121, a cooling-fluid outlet 123, a set of stator windings 122, and a stator-sealed space 140. The set of stator windings 122 are positioned with the stator-sealed space 140 proximate to the set of magnets 114 of the rotor 110 such that during operation of the axial flux electric motor 100 magnetic flux between the set of stator windings 122 and the set of magnets 114 is aligned substantially parallel to the motor axis 101. The cooling-fluid inlet 121 and the cooling-fluid outlet 123 are fluidically coupled to the stator-sealed space 140.

Method 500 may proceed with (block 510) filling the immersion-cooled axial flux electric motor 100 with a thermal fluid 438 by pumping the thermal fluid 438 into the cooling-fluid inlet 121 and until the thermal fluid 438 is displaced from the cooling-fluid outlet 123.

In some examples, the immersion-cooled stator 120 further comprises a set of inlet distribution tubes 150 fluidically coupled to the cooling-fluid inlet 121. The set of inlet distribution tubes 150 are supported by the stator base 130 and extend radially from the stator base 130. The immersion-cooled stator 120 further comprises an outlet collection tube 156 extending through one of the gaps between the set of stator windings 122 within the stator-sealed space 140. The outlet collection tube 156 is oriented substantially vertically, defined by a gravitational force, while filling the immersion-cooled axial flux electric motor 100 with the thermal fluid 438. For example, the outlet collection tube 156 comprises a collection-tube opening 157 positioned proximate to the stator shroud 128, and the collection-tube opening 157 is at the highest position, defined by the gravitational force while filling the immersion-cooled axial flux electric motor 100 with the thermal fluid 438.

Method 500 may proceed with (block 520) operating the immersion-cooled axial flux electric motor 100 by supplying electric power to the set of stator windings 122 and by pumping the thermal fluid 438 into the cooling-fluid inlet 121, through the stator-sealed space 140, and out of the cooling-fluid outlet 123. In some examples, this operating operation (block 520) further comprises monitoring one or more temperatures of the thermal fluid 438 (block 525), e.g., one temperature before the thermal fluid 438 is flown into the immersion-cooled axial flux electric motor 100 and another temperature when the thermal fluid 438 is received from the immersion-cooled axial flux electric motor 100. A combination of these temperatures (as well as the flow rate and the heat capacity of the thermal fluid 438 indicates the power losses/internal heating of the immersion-cooled axial flux electric motor 100. In some examples, this operating operation (block 520) further comprises (block 530) adjusting the flow rate of the thermal fluid 438, e.g., based on the temperature measured in the previous operation.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

The invention claimed is:

1. An immersion-cooled axial flux electric motor comprising:
a motor axis;
a rotor comprising a set of magnets and a magnet support plate extending perpendicular to the motor axis, wherein the set of magnets is attached to the magnet support plate and distributed about the motor axis; and
an immersion-cooled stator comprising a cooling-fluid inlet, a cooling-fluid outlet, a set of stator windings, and a stator-sealed space, wherein:
the set of stator windings is positioned within the stator-sealed space proximate to the set of magnets of the rotor such that during operation of the axial flux electric motor magnetic flux between the set of stator windings and the set of magnets is aligned substantially parallel to the motor axis,
the cooling-fluid inlet and the cooling-fluid outlet are fluidically coupled to the stator-sealed space,
the immersion-cooled stator further comprises stator end plates, winding-end units, a stator shroud forming a ring about the motor axis, and a stator base collectively forming the stator-sealed space,
the stator end plates extend perpendicular to the motor axis and are sealed against the stator base at a first end and against the stator shroud at a second end, positioned further away from the motor axis than the first end,
the winding-end units are attached to opposite sides of the set of stator windings, extend into openings of the stator end plates, and are sealed against the stator end plates within the openings of the stator end plates,
the immersion-cooled stator further comprises a set of inlet distribution tubes fluidically coupled to the cooling-fluid inlet,
the set of inlet distribution tubes is supported by the stator base and extends radially from the stator base, and
the immersion-cooled stator further comprises an outlet collection tube extending through one of gaps between the set of stator windings within the stator-sealed space.

2. The immersion-cooled axial flux electric motor of claim 1, wherein the set of inlet distribution tubes has a constant circumferential offset from each other about the motor axis.

3. The immersion-cooled axial flux electric motor of claim 1, wherein the set of inlet distribution tubes extends radially into gaps between adjacent winding pairs of the set of stator windings within the stator-sealed space.

4. The immersion-cooled axial flux electric motor of claim 1, wherein each tube in the set of inlet distribution tubes comprises a set of distribution orifices, radially offset relative to each other on each tube in the set of inlet distribution tubes.

5. The immersion-cooled axial flux electric motor of claim 4, wherein the set of distribution orifices have different diameters on different tubes in the set of inlet distribution tubes.

6. The immersion-cooled axial flux electric motor of claim 4, wherein the set of distribution orifices have different diameters on a same tube in the set of inlet distribution tubes.

7. The immersion-cooled axial flux electric motor of claim 1, wherein the set of inlet distribution tubes comprises at least 18 tubes.

8. The immersion-cooled axial flux electric motor of claim 1, wherein an end of each tube in the set of inlet distribution tubes, proximate to the stator shroud is sealed.

9. The immersion-cooled axial flux electric motor of claim 1, wherein the outlet collection tube comprises a collection-tube opening positioned proximate to the stator shroud.

10. The immersion-cooled axial flux electric motor of claim 1, wherein:
the stator base comprises an inlet fluidic pathway fluidically coupling the cooling-fluid inlet and each tube in the set of inlet distribution tubes, and
the stator base comprises an outlet fluidic pathway fluidically coupling the cooling-fluid outlet and the outlet collection tube.

11. The immersion-cooled axial flux electric motor of claim 10, wherein a portion of the inlet fluidic pathway has a ring shape, centered about the motor axis and providing distribution to a thermal fluid to the set of inlet distribution tubes.

12. The immersion-cooled axial flux electric motor of claim 1, wherein:
the immersion-cooled stator further comprises a terminal cover and contact terminals,
the contact terminals are connected to the set of stator windings and protrude through the terminal cover,
the cooling-fluid inlet and the cooling-fluid outlet protrude through the terminal cover.

13. An electric vehicle comprising:
a battery;
an inverter;
a vehicle cooling system comprising a radiator, a pump, and a system controller; and
an immersion-cooled axial flux electric motor, electrically coupled to the battery and the inverter and comprising:
a motor axis;
a rotor comprising a set of magnets and a magnet support plate extending perpendicular to the motor axis, wherein the set of magnets is attached to the magnet support plate and distributed about on the motor axis; and
an immersion-cooled stator comprising a cooling-fluid inlet, a cooling-fluid outlet, a set of stator windings, and a stator-sealed space, wherein:
the cooling-fluid inlet and the cooling-fluid outlet are fluidically coupled to the vehicle cooling system,
the set of stator windings is positioned within the stator-sealed space proximate to the set of magnets of the rotor such that during operation of the axial flux electric motor magnetic flux between the set of stator windings and the set of magnets is aligned substantially parallel to the motor axis,
the cooling-fluid inlet and the cooling-fluid outlet are fluidically coupled to the stator-sealed space,
the immersion-cooled stator further comprises stator end plates, winding-end units, a stator shroud forming a ring about the motor axis, and a stator base collectively forming the stator-sealed space,
the stator end plates extend perpendicular to the motor axis and are sealed against the stator base at a first end and against the stator shroud at a second end, positioned further away from the motor axis than the first end, the winding-end units are attached to opposite sides of the set of stator windings, extend into openings of the stator end plates, and are sealed against the stator end plates within the openings of the stator end plates, the immersion-cooled stator further comprises a set of inlet distribution tubes fluidically coupled to the cooling-fluid inlet, the set of inlet distribution tubes is supported by the stator base and extends radially from the stator base, and the immersion-cooled stator further comprises an outlet collection tube extending through one of gaps between the set of stator windings within the stator-sealed space.

14. The electric vehicle of claim 13, wherein the system controller is configured to record an initial temperature input and an exit temperature input and configure the pump to operate at a speed predetermined to maintain a difference between the initial temperature input and the exit temperature input within a pre-defined range.

15. The electric vehicle of claim 13, wherein the vehicle cooling system is further fluidically coupled to at least one of the battery and the inverter.

16. A method of operating an immersion-cooled axial flux electric motor on an electric vehicle, the method comprising:
providing an immersion-cooled axial flux electric motor comprising:
a motor axis;
a rotor comprising a set of magnets and a magnet support plate extending perpendicular to the motor axis, wherein the set of magnets is attached to the magnet support plate and distributed about on the motor axis;
an immersion-cooled stator comprising a stator base, a cooling-fluid inlet, a cooling-fluid outlet, a set of stator windings, and a stator-sealed space, wherein:
the set of stator windings is positioned within the stator-sealed space proximate to the set of magnets of the rotor such that during operation of the axial flux electric motor magnetic flux between the set of stator windings and the set of magnets is aligned substantially parallel to the motor axis, and
the cooling-fluid inlet and the cooling-fluid outlet are fluidically coupled to the stator-sealed space;

the immersion-cooled stator further comprises a set of inlet distribution tubes fluidically coupled to the cooling-fluid inlet, the set of inlet distribution tubes are supported by the stator base and extend radially from the stator base, the immersion-cooled stator further comprises an outlet collection tube extending through one of gaps between the set of stator windings within the stator-sealed space, and the outlet collection tube is oriented substantially vertically, defined by a gravitational force, while filling the immersion-cooled axial flux electric motor with the thermal fluid, filling the immersion-cooled axial flux electric motor with a thermal fluid by pumping the thermal fluid into the cooling-fluid inlet and until the thermal fluid is displaced from the cooling-fluid outlet; and operating the immersion-cooled axial flux electric motor by supplying electric power to the set of stator windings and by pumping the thermal fluid into the cooling-fluid inlet, through the stator-sealed space, and out of the cooling-fluid outlet.

17. The method of claim 16, wherein:
the outlet collection tube comprises a collection-tube opening positioned proximate to a stator shroud, and
the collection-tube opening in at a highest position, defined by the gravitational force, while filling the immersion-cooled axial flux electric motor with the thermal fluid.

18. The electric vehicle of claim 13, wherein the vehicle cooling system and the immersion-cooled axial flux electric motor are filled with a thermal fluid selected from the group consisting of a mineral oil and a transformer oil.

19. The method of claim 16, wherein the thermal fluid is selected from the group consisting of a mineral oil and a transformer oil.

20. The method of claim 16, wherein further comprising:
monitoring a first temperature of the thermal fluid before the thermal fluid is flown into the immersion-cooled axial flux electric motor,
monitoring a second temperature of the thermal fluid when the thermal fluid is received from the immersion-cooled axial flux electric motor, and
adjusting a flow rate of the thermal fluid based on the first temperature and the second temperature.

* * * * *